(12) United States Patent
Nelson

(10) Patent No.: US 6,575,234 B2
(45) Date of Patent: Jun. 10, 2003

(54) DYNAMIC HEATING AND COOLING OF A BUILDING USING LIQUID FOAM

(75) Inventor: Richard C. Nelson, Pierrefonds (CA)

(73) Assignee: Sunarc Structures Inc., Montreal (CA)

( * ) Notice: Subject to any disclaimer, the term of this patent is extended or adjusted under 35 U.S.C. 154(b) by 0 days.

(21) Appl. No.: 10/142,881

(22) Filed: May 13, 2002

(65) Prior Publication Data

US 2002/0134541 A1 Sep. 26, 2002

Related U.S. Application Data

(63) Continuation of application No. PCT/CA01/00348, filed on Mar. 16, 2001.
(60) Provisional application No. 60/190,014, filed on Mar. 17, 2000.

(51) Int. Cl.$^7$ ............................... F24F 11/06; F24J 2/34
(52) U.S. Cl. .................... 165/247; 165/10; 165/243; 165/53; 126/586; 126/587; 126/617
(58) Field of Search ................................ 165/10, 10 A, 165/47, 53, 247, 243; 126/572, 585, 586, 587, 617, 621, 628

(56) References Cited

U.S. PATENT DOCUMENTS

| | | | | |
|---|---|---|---|---|
| 2,228,903 A | * | 1/1941 | Birdsall | |
| 3,563,305 A | * | 2/1971 | Hay | |
| 3,672,184 A | | 6/1972 | Zeilon | |
| 3,799,247 A | * | 3/1974 | Champot | |
| 4,355,682 A | * | 10/1982 | Maloney | 165/53 X |
| 4,452,230 A | * | 6/1984 | Nelson | 126/621 |
| 4,562,674 A | * | 1/1986 | Nelson | |
| 4,662,433 A | * | 5/1987 | Cahn et al. | |
| 4,663,897 A | * | 5/1987 | Ridett | 165/53 X |
| 5,123,247 A | * | 6/1992 | Nelson | |
| 5,632,327 A | * | 5/1997 | Andersson | 165/53 X |
| 6,142,214 A | * | 11/2000 | Liljedahl | 165/53 X |

* cited by examiner

Primary Examiner—Ljiljana Ciric
(74) Attorney, Agent, or Firm—Ogilvy Renault; Robert Mitchell

(57) ABSTRACT

A heating and cooling system and a method for controlling and regulating the temperature within a building envelope (10) having roof and wall cavities (14) adapted to receive replaceable foam liquid. The interior of the building envelope (10) is maintained at any specific controlled temperature by controlling the temperature of the liquid foam. The temperature of the liquid foam within the roof and wall cavities (14) is sensed and when a change in temperature is detected, a dynamic liquid foam regeneration unit is triggered so as to supply new liquid foam at an appropriate temperature so as to maintain the overall temperature of the liquid foam in the roof and wall cavities (14) substantially constant.

5 Claims, 3 Drawing Sheets

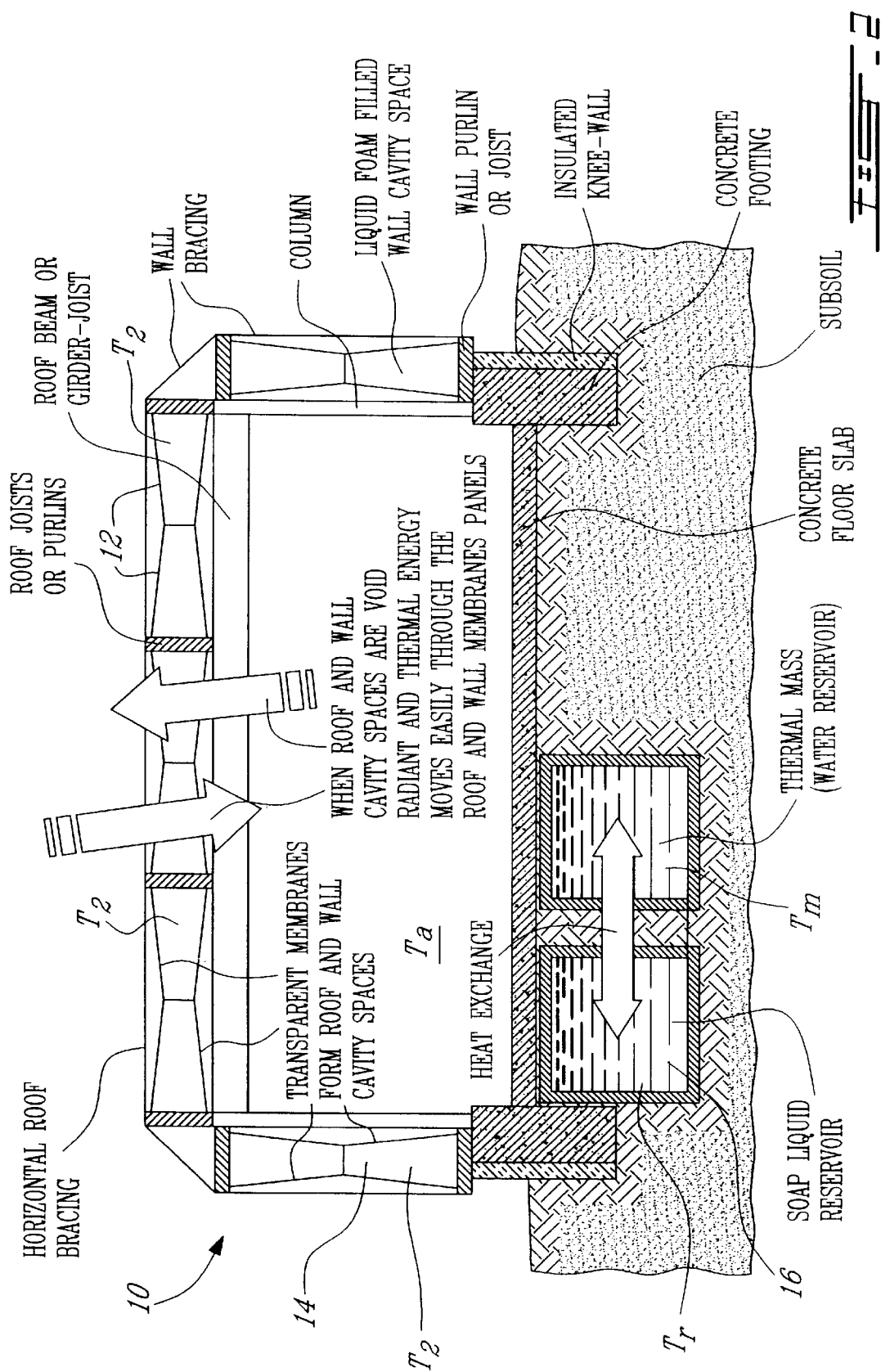

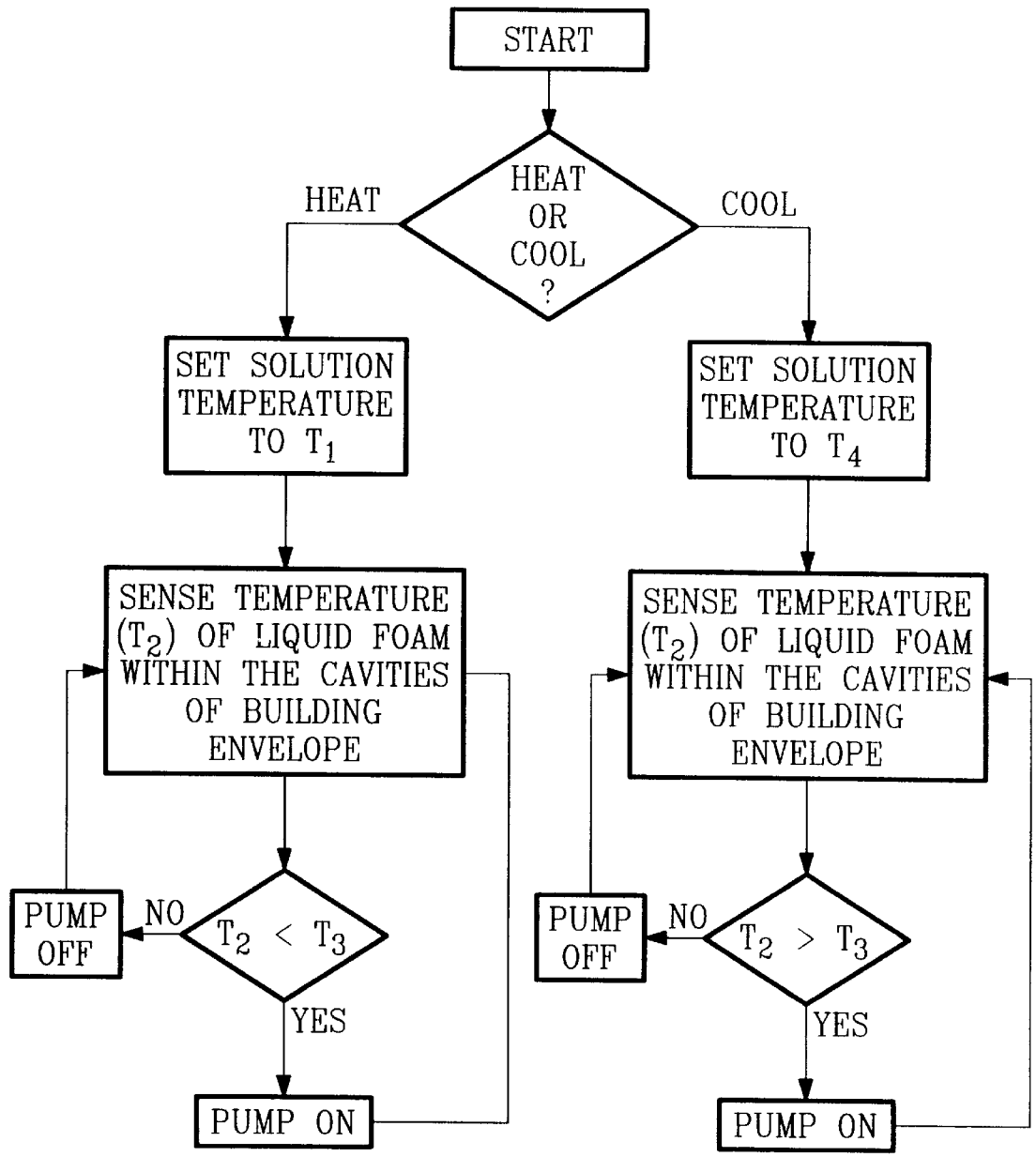

DYNAMIC HEATING AND COOLING OF A BUILDING USING LIQUID FOAM

RELATED APPLICATIONS

This is a continuation of International PCT Application No. CA01/00348 filed on Mar. 16, 2001, which claims benefit of U.S. Provisional Patent Application No. 60/190,014 filed on Mar. 17, 2000.

BACKGROUND OF THE INVENTION

1. Field of the Invention

The present invention relates to the creation and regulation of a comfortable environment within buildings and enclosures and the like, for the purpose of providing shelter from the outside climate.

2. Description of the Prior Art

Global population growth together with the urgent need to improve the standard of living of billions of peoples, has created the necessity to find an ecological means to provide controlled environments at a low cost so that comfortable habitation and work places are available for all. An affordable controlled environment technology is needed to ensure that all populations will be able to access the highest possible standard of living. At the same time it is imperative to protect the global ecology and natural environment through the development of a sustainable controlled environment technology that may be powered by renewable solar energy resources.

In the United States, building heating, ventilating, air-conditioning (known as "HVAC") and lighting account for approximately 40% of energy use, and they consume over 60% of the electricity produced. A substantial portion of all of the energy used in delivery of these conventional HVAC processes is derived from the combustion of fossil fuels, which results in the generation of $CO_2$, a greenhouse gas that contributes to global warming. Additionally, air-conditioning processes are destructive to the ozone layer resulting in a potentially dangerous increase in the UV radiation reaching the surface of the earth. The generation of electrical energy is also creating problems of excessive thermal pollution. When the fuels are combusted to generate electricity by means of steam turbine power, 66% of the heat energy is immediately lost in this energy conversion step, that is the latent energy of vaporization is given up as "waste heat" when the steam condenses at the condenser. This waste heat is usually absorbed by the local rivers and lakes, or is rejected to the atmosphere using costly cooling towers that consume a great quantity of water.

In the distant past, building envelopes were built with materials and methods that did not provide a practical means to maintain the interior at any specific controlled temperature, and as a result, in cold climates and winter seasons the building environment could be cold and uncomfortable. The technological solution was the development of the fireplace. Heavy masonry fireplace structures could absorb the high temperature and high rate of energy release from open flame combustion of wood and re-radiate this energy more slowly into the building. This radiative heating would then increase the surface temperature of walls, floor and roof structures in the immediate vicinity of the fireplace. There were still many hardships for building occupants because of the limitations of such methods. Over recent decades, with improved building envelope construction and the advent of central heating systems, the performance of the heating systems has so increased as to provide reasonable comfort throughout an entire building, at any time that heating many be required. Modern central furnace or boiler units have now replaced the open fireplace and air, hot water or steam is used as the working (heat exchange) fluid for the distribution and radiation of the heat; providing comfort throughout the building.

In modern times building insulation and infiltration barriers used in the building envelope have made buildings more comfortable and at the same time have reduced the expenditure of energy to achieve a controlled environment. The technology for heating the building remains based upon the use of high-grade, high temperature energy sources that distribute heat into the building using conduction and radiation from the heat exchanger units. We now also have the expectation that comfort in buildings will extend to the hot climates and seasons by means of air-conditioning systems. The approach to this technology has been modeled upon that of heating systems where mechanical units control rooms or regions of the building or the entire building may be cooled with a central mechanical system. Air-conditioning is similar to heating, in that the process uses a mechanical system powered by high-grade (electrical) or high temperature energy to generate cold temperatures at one or more heat exchangers. These cold thermal absorbers are a heat sink in relation to the building atmosphere, taking in heat by conduction and by precipitation of humidity from the air.

The state-of-art-technologies do not control humidity within buildings and tend to leave the atmosphere overly dry. This is due to the relatively large temperature difference existing at the heat exchanger device. Another deficiency is the excessive reliance upon artificial lighting due to the poor performance of windows when compared to the general insulation standards of building envelope construction today. Also, while the heat lost through windows on cold nights is extreme, the heat gain problem is just as severe. Sunlight coming into a building through windows can cause serious overheating. Because of these problems, the current recommendations for energy efficient building construction call for minimum use of windows or "glazing system", including skylights. The use of windows for "passive solar collectors" in buildings has all but been abandoned because of the very negative impact on HVAC cost that is typical of such prior solar design.

Conventional "active" solar collectors are an alternate approach. These are heat collector devices that are placed on the exterior of the insulated roof or wall construction. Such systems have been generally proven to be costly, inefficient and complex. Direct conversion of solar radiation to electrical energy by photocells is, on the other hand, becoming more cost effective (for the supply of electricity in remote sites) and is inherently simple and reliable. However the complete system cost of photoelectric systems is still very high and battery storage remains a weakness.

Solar design has been approached in the same way as previous HVAC design, that is, it is expected that high temperature or high grade energy outputs would be the primary objective. This assumption is made in spite of the fact that the desired result is simply the maintenance of the building environment in the comfort zone. However, the problem is that if heat exchangers are operated at, or close to room temperature, no energy will be transferred. Without any significant temperature difference to cause conductive transfer, a heat exchanger simply will not function. Another problem is that the radiator units must have a very large area if they are to use low-grade energy (operate close to room temperature). Conversely, practical dimensioned heat exchangers (radiators) must run relatively hot or cold to have any effect. A tepid heat exchanger of conventional design will result in ineffective heating or cooling.

SUMMARY OF THE INVENTION

It is therefore an aim of the present invention to provide a technology that can reduce the use of non-renewable energy for building heating, cooling and lighting.

It is also an aim of the present invention to provide a novel method of controlling the temperature within a building envelope.

It is also an aim of the present invention to provide saving on electrical power consumption.

It is a further aim of the present invention to provide a method of controlling a building environment using low-grade energy in a thermal mass.

Therefore, in accordance with the present invention there is provided a method of controlling the temperature within a building envelope having roof and wall cavities adapted to receive an insulation material. The method comprises the steps of: a) providing a replaceable insulation material at a selected controlled supply temperature within the roof and wall cavities, and b) controlling the temperature of the insulation material while in use in the roof and wall cavities so as to maintain the insulation material temperature within a range of temperature determined as a function of a desired controlled environment temperature within the building envelope.

In accordance with a further general aspect of the present invention, there is provided a heating and cooling system for controlling the temperature within a building envelope having roof and wall cavities adapted to receive replaceable liquid foam insulator. The system comprises a liquid foam generating unit for providing liquid foam at a preselected temperature within the roof and wall cavities, a sensor for sensing the temperature of the liquid foam in the roof and wall cavities, and a control unit for actuating the liquid foam generating unit when the sensed temperature starts to fall outside of a predetermined range of temperature so that new liquid foam be generated within the roof and wall cavities at said preselected temperature in order to maintain the temperature of the liquid foam in the roof and wall cavities within the predetermined range.

In accordance with a further general aspect of the present invention, the innovative approach to solar energy utilization as provided in this invention can largely substitute solar for costly conventional energy. Additionally, there is disclosed herein a cooling process that can utilize a chilled liquid, such as water. For instance, the cooling process can tap into cold water derived from ground, lake or ocean water heat sinks or from a chilled thermal mass. Both the heating and cooling processes use low-grade, low temperature energy dynamically distributed throughout a building envelope. A special type of building envelope is used, one characteristic of which is that the roof and/or wall construction may be transparent so that, whenever available, natural daylight may be used instead of artificial lighting, thereby providing a large saving on electrical power consumption.

BRIEF DESCRIPTION OF THE DRAWINGS

Having thus generally described the nature of the invention, reference will now be made to the accompanying drawings, showing by way of illustration a preferred embodiment thereof, and in which:

FIG. 2 is the same schematic cross-sectional view of the building structure of FIG. 1 showing the void cavity spaces in the roof and wall envelope during periods that the liquid foam dynamic heating and cooling process is not functioning; and FIG. 3 is a logic flowchart providing rules that regulate the use of the liquid foam in wall and roof cavities of the building structure of FIG. 1 for dynamic heating and cooling of a building.

DESCRIPTION OF THE PREFERRED EMBODIMENTS

Figure 1:
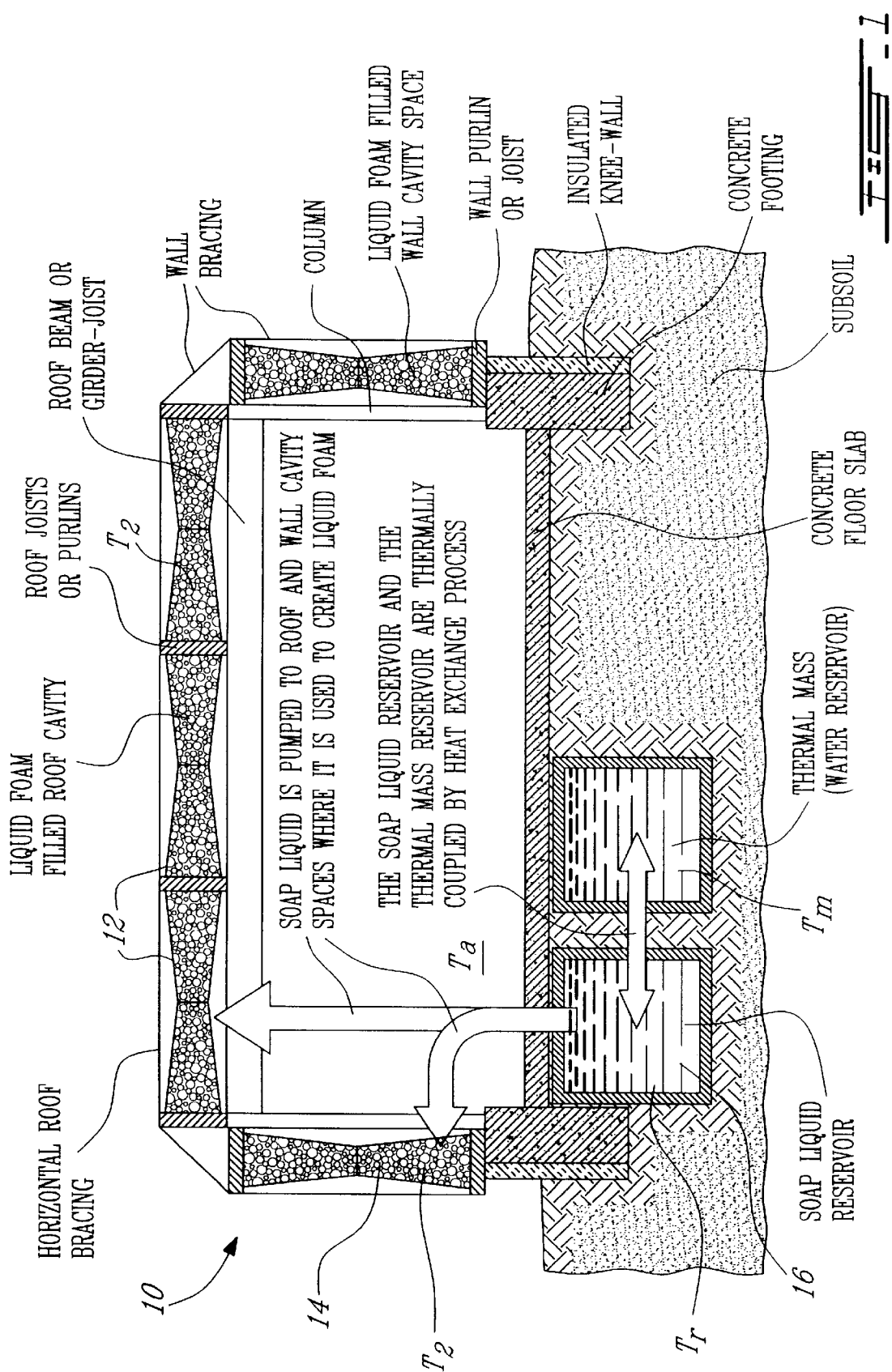
FIG. 1 is a schematic cross-sectional view of a building structure wherein the wall and roof envelope thereof are filled with liquid foam that provides dynamic heating and cooling.

The present invention is generally directed to methods and devices for mechanical processes that control a building environment by utilizing available solar energy and ambient cooling resources that are integrated directly into the construction of the building. Therefore, the present invention is best used in conjunction with buildings that are specially built to generate low-grade thermal energy from the solar energy incident upon the building. The present approach can advantageously use large reserves of low-grade thermal energy collected in a water pool or reservoir called a thermal mass, which is an important component of such buildings.

The means are provided herein to far exceed the primitive necessities of shelter from rain, snow, wind and hot sun. The objective is to provide comfortable, sunlit, warmed or cooled and humidity controlled environments so that in spite of extremes of climate and seasons. The occupants of such improved controlled environment buildings may enjoy bright, pleasant, garden-like surroundings, within which they may build self-sufficient solar communities, and develop a sustainable lifestyle.

This invention is related to the utilization of low-grade energy. Such energy may be considered as free energy because it may present in large quantity in the ambient environment. Also, because low temperature energy is not generally useful or capable of producing any vapor pressure (except with special working fluids used in closed cycle gas turbines and in conjunction with a cold condenser temperature) nor of driving any conventional mechanical systems, it is usually assumed to have no value. Low-grade energy is almost always present and associated with high-grade energy processes that produce "waste energy" in the form of low-grade heat.

In particular, lighting, with lamps or by natural sunlight, is a high-grade energy process that produces a substantial amount of waste energy. This is due to the fact that very little of this radiant energy can be directly used or transformed and what is not transmitted or reflected is absorbed (and re-emitted as thermal radiation). Therefore almost all the solar or lamp energy transmitted into a building must be re-radiated at ambient or near ambient temperatures that is sensed as low-grade heat. This re-radiation is very long wave thermal radiation and is not to be confused with solar infrared energy. The process of conductive heat transfer and the emissive characteristics of the material determine the temperature the body will reach before radiative equilibrium is attained. Air is a poor conductor of heat with a very small capacitance and therefore in normal circumstances all (non-living, inanimate) bodies and surfaces in a transparent solar building will become warm; therefore, human occupants will be exposed to these high radiant temperatures and suffer discomfort. However, the Solar Roof technology as disclosed in my U.S. Pat. No. 5,123,247 issued on Jun. 23, 1992, which is herein incorporated by reference, provides a means to remove the excess solar energy at below room temperature and transfer this energy to a large cool water reservoir that serves as a Thermal Mass. This thermal mass holds a lot of energy that could be available for heating and cooling, however the temperature is neither hot nor cold and no known heating or cooling processes can use this energy effectively.

The present invention provides an innovative method by means of which low-grade energy in a Thermal Mass can be utilized effectively to regulate and control the environment within a building of a type as disclosed in my U.S. Pat. No. 4,452,230 issued on Jun. 5, 1984 and my pending U.S. Provisional Patent No. 60/138,548 filed on Jun. 10, 1999, which are herein incorporated by reference. Such building construction methods as disclosed in the aforesaid documents are appropriate for the optimum use of Replaceable Foam Insulation, which is a new technology for the insulation of buildings as described in my U.S. Pat. No. 4,562,674, which is herein incorporated by reference.

FIG. 1 illustrates such a building structure 10 constructed with double or triple layers of transparent or translucent sheet materials 12 forming a building envelope wherein there are wall and roof cavities 14 formed between the sheet materials 12. The wall and roof cavities 14 are adapted to be selectively filled with a liquid foam insulation stored in a reservoir 16.

Research programs have been operated using various prototype buildings that were configured for using the Replaceable Foam Insulation technology. One of the ongoing research programs conducted within the prototype buildings is the evaluation of the insulation value of the Replaceable Foam Insulation and the scientific measurement of the "coefficient of thermal resistance", or as it is commonly known, the R-Value. The inverse of this coefficient is the thermal conductivity. There was a problem in achieving this research objective, in that we found that the liquid foam insulation material has no fixed thermal coefficient. We found that the R-Value is a complex value that changes continuously over time. It was also determined that the R-Value changes with the change in temperature of the liquid foam insulation material itself. Cooler bubbles (foam insulation) entrap air that has a lower partial pressure of water vapor. Since it is believed that vapor migration through the bubbles from the warm side to the colder side is one of the heat transfer mechanisms, then the lower vapor pressure in cooler bubbles contributes to a reduced total heat transfer and an apparent increased R-Value.

When operating prototype buildings on cold winter nights while using the Replaceable Foam Insulation process, we collected temperature data on the total system. Because of the natural instability of the liquid insulation it needs replacement several times during a very cold winter night. The method used was to regenerate the liquid foam on a timer cycle. The timer cycle is determined in connection with the instability of the Liquid Foam and would typically require bubble regeneration every hour or two. The result of such operations was that the liquid foam or soap liquid used to generate the liquid insulation, and the associated storage tank or reservoir would gradually become cold. Therefore, the interior wall and roof membranes of the building envelope became cold. The conventional heating systems would then be activated to maintain the proper building environment temperature.

When operating the liquid insulation system in a similar manner in the summer for insulating purpose on hot days, it was found that the soap liquid could become quite warm after a few regeneration cycles. The liquid foam would therefore not provide as effective insulation since the warmer bubbles insulate poorly as compared to cool bubbles. Additionally, warm bubbles result in the interior membrane of the walls and roof envelope to be warm and this causes the building environment to over heat.

These experiences provided the basis for a further innovation: the concept of controlling the temperature of the soap liquid as a means of enhancing the insulation property and creating a totally new system of heating and cooling of great effectiveness. This new approach comprises a dynamic liquid foam system. The dynamics of this system are not based on liquid foam dissipation (and its replacement) but rather the detection of a change in liquid foam temperature. Dynamic regeneration is triggered when the liquid foam temperature change, either becoming warmer or colder, is detected to be too great in relation to the controlled environment in the building, i.e. the desired temperature $T_a$ within the building. More specifically, we learned through operational experience that the optimum temperature of the soap liquid used to generate the liquid foam insulation within the roof cavity spaces of a building would be a few degrees below "room temperature". The room temperature or controlled environment temperature $T_a$ might be set for, say 70 degrees Fahrenheit (22° C.), and therefore the optimum soap liquid temperature would be about 60 degrees Fahrenheit (17° C.) for example.

It was also determined that the shorter the cycle time between regeneration of the Liquid Foam Insulation the less the soap liquid, on returning to the soap liquid tank, would be found to be too warm or too cold. That is, the liquid insulation material would not remain very long in the roof or wall cavity and therefore would not have time to become cold or warm. Thus a process control strategy would shorten the regeneration cycle time in response to a more rapid temperature gain or loss. Therefore the cycle time is not based on foam dissipation but on temperature change that is detected using a thermocouple sensor placed in the middle of the foam cavity space. This temperature sensor is used to control the foam regeneration cycle in order thereby to limit temperature gain or loss of the liquid foam.

A further aspect of this innovation involves the heating or cooling of the soap liquid so as to supply the Liquid Foam Insulation within a range of about 50 to about 70 degrees Fahrenheit (12° C. and 22° C.) when it is initially generated. The optimum range is comprised between 60 to 70 degrees Fahrenheit (17° C. and 22° C.). Then, with a more constant temperature in the roof and walls of the building, we were able to proceed to evaluate the performance of the heating and cooling systems and determine an overall value for thermal resistance. This approach to a determination of an overall R-Value requires the quantification of energy inputs for heating or cooling to maintain a steady temperature during a period of time. Then, the temperature difference across the insulated wall and roof cavity spaces are measured and recorded during the same period of time. With this data and the total area of the building envelope an average R-Value for the whole building envelope may be calculated. The average R-Value as determined by this means was very satisfactory but an even more surprising and unexpected result was obtained during these investigations.

The unexpected result was that the conventional building heating and cooling systems were never needed to control the building environment. By controlling the supply temperature of the soap liquid and controlling and limiting any significant temperature gain or loss while in use in the roof and wall cavity, the building environment was actually controlled and regulated as a result. No energy inputs were recorded for the heating or cooling systems normally used to control the temperature of the building environment as long as the soap liquid temperature was maintained in the correct temperature range. For test purposes the soap liquid reservoir 16 was equipped with an electric resistance element for heat input and with a cold water loop heat exchanger for cooling inputs. Various sizes of soap liquid tanks were also studied since larger reservoir capacity can be utilized to slow down the rate of temperature change of the soap liquid reservoir.

A large soap liquid reservoir will remain within the correct temperature range for a longer period of time because of its large thermal capacity. This is an energy storage mechanism and can be very important in achieving high efficiency. For instance, the larger reservoir can absorb a greater quantity of solar gain during the daytime and then release the energy slowly over a cold night. Industrial waste heat or district heating systems may be utilized to provide low temperature, low cost heat through a heat exchanger device located in the soap liquid reservoir. Also, a larger reservoir may use off-peak energy resources for the heating or cooling of the reservoir.

It was found that a large soap reservoir could act as a thermal mass used to store heating or cooling energy that then is distributed at different times as needed to control the building envelope temperature and thereby control the building environment. Also, as seen in FIGS. 1 and 2, the soap liquid can be coupled thermally to a separate reservoir forming a thermal mass having a temperature $T_m$ and thereby gain an apparent increase in thermal capacitance. Any large water body or aquifer internal to the building or external and reasonably accessible will serve to provide further capacitance for this new environmental control process. Therefore, low-grade energy resources may be tapped by coupling these resources to the soap liquid reservoir. Cold aquifers or cold coastal waters can be used through heat exchanger devices in order to provide virtually infinite heat sink capacity.

In another embodiment of this invention, the soap liquid that is used to make the replaceable liquid foam in cavity spaces of the building envelope can also be used as a working fluid in the Solar Roof Technology. As such the soap liquid can be used directly as a solar energy collector working fluid or as the working fluid circulated to the chiller cavity spaces as defined in my U.S. Pat. No. 5,123,247. The soap liquid reservoir then would serve as the Thermal-Mass as specified in U.S. Pat. No. 5,123,247. Other liquid or water bodies may be coupled thermally to form a larger virtual Thermal-Mass that is thereby indirectly chilled or warmed by the Solar Roof processes.

All of the variations in configuration described above have the intention of reducing the need of consuming high grade conventional energy resources for the purpose of heating or cooling the soap liquid to maintain the soap liquid in the correct temperature range that will control the building environment. If chilled water heat sinks are not readily at hand in the location of the building then the Solar Roof process can provide a chilling action on the soap liquid. If solar energy is available then the Solar Roof process can transfer solar gains to the soap liquid which is then used directly or indirectly to store and then release the low-grade thermal energy, as needed, in the building envelope. If solar gains are insufficient then other low-grade energy can be utilized including the waste heat of lamps, the rejection energy of electrical power generation or other industrial or geothermal or other renewable energy resources.

It is known from the teaching of my U.S. Pat. No. 4,562,674 how to generate liquid foam to fill cavity spaces in building envelopes in order to provide a replaceable insulation. This system was developed to permit the switching of the envelope from an insulated mode to a transparent solar collecting mode and back on a diurnal cycle. This is an alternative to conventional insulation. This innovation permits the building itself to act as an active solar device and provide at the same time natural lighting within the building. Also, my U.S. Pat. No. 5,123,247 describes innovative, building integrated, solar collection and energy conversion methods that are completely compatible with the Replaceable Foam Insulation. However, neither of these previous patents discloses a technology for regulating a controlled environment within a building using low-grade energy.

The present invention provides a new building heating and cooling method that can be used in conjunction with these previous methods and provide thereby improved function and efficiency to these controlled environment buildings. As a result, a conventional building heating and cooling mechanisms can be eliminated or used only to backup the heating and cooling method provided herein. A further objective is to specify a process which is capable of being automated and controlled by a computer.

In this process of dynamic heating and cooling, the liquid foam physically delivers low-grade energy to the envelope of the building at a suitable temperature and rate. The quantity of energy and the rate of delivery are reduced due to the good insulating property of the liquid foam and due to the high heat capacitance of liquid foam, where the liquid component is largely composed of water. Furthermore, the liquid foam has the capacity, with evaporation of some of the water component, to remove a great deal of heat energy while it is within the building envelope and is exposed to solar energy. The soap liquid from which the liquid foam is generated has the advantage of good heat transfer with water-to-water type heat exchangers and may be used directly as a working fluid in related processes.

The process of using the liquid foam is a thermodynamic system involving continuous, automated acquisition of temperature data that is then analyzed to determine what action is to be taken to regulate the building environment.

As seen in FIG. 3, the heating and cooling system functions under two modes, namely a heating mode and a cooling mode. Once the mode has been selected, the temperature of the soap liquid in the storage tank or reservoir is heated or cooled to a predetermined temperature. For instance, under the heating modes, the temperature $T_r$ of the soap liquid in the reservoir could be respectively maintained at $T_1$=70 degrees Fahrenheit (22° C.). Similarly, under the cooling mode, the temperature $T_r$ of the stored soap liquid could be maintained at $T_4$=50 degrees Fahrenheit (12° C.). The temperature $T_2$ of the liquid foam (soap liquid) within the building envelope is continuously sensed by at least one thermocouple disposed within the roof and wall cavities of the building structure. The sensed data are computed by a control system which is operatively connected to a pump mechanism effective for pumping soap liquid into the roof and wall cavities of the building structure where it is blown into bubbles forming the liquid foam. When the system is operating under the heating mode, soap liquid is automatically pumped to roof and wall cavities upon detection by the control unit that the sensed temperatures $T_2$ become inferior to a threshold temperature $T_3$ which could be fixed at 60 degrees Fahrenheit (17° C.). Likewise, under the cooling mode, the soap liquid is automatically pumped from the storage tank to the roof and wall cavities when the control unit detects that the sensed temperatures $T_2$ become superior to the threshold temperature $T_3$.

The scope of this invention intends to cover variations in logic that are appropriate for different climates, as well as appropriate rules to operate a system efficiently throughout the different seasons experienced at any locality. The logical scheme should also encompass the dramatic variations in climate occurring from day to night.

It is usual for the liquid foam cooling process to be used during the daytime because there is almost always internal heat gain within the building. This is especially true of the transparent membrane envelope buildings. These buildings capture energy because of their "greenhouse effect". Overnight, the temperature within the building is usually lower than the daytime temperature and the most efficient strategy for use of liquid foam (even during cold winter nights) is to match the liquid foam temperature, on average, to the nighttime setback temperature of the building environment. During moderately cool nights it is possible to avoid the use of liquid foam since the internal temperature may balance with the external environment.

What is claimed is:

1. A method of controlling the temperature within a building envelope having roof and wall cavities adapted to receive an insulation material, the method comprising the steps of:

a) providing a replaceable insulation material at a selected controlled supply temperature within said roof and wall cavities, and b) controlling the temperature of said replaceable insulation material while in use in the roof and wall cavities so as to maintain said temperature within a range of temperature determined as a function of a desired controlled environment temperature within the building envelope, wherein step b) includes the step of regenerating the replaceable insulation material by sensing the temperature of the replaceable insulation material within the roof and wall cavities, and upon detection that the temperature starts to fall outside of the predetermined range of temperature, supplying new replaceable insulation material within the roof and wall cavities at the selected control supply temperature so as to maintain the temperature of the replaceable insulation material in the roof and wall cavities within the predetermined range.

2. A method as defined in claim 1, wherein the replaceable insulation material is generated from soap liquid contained in an insulated reservoir, and wherein step a) includes the step of controlling the temperature of the soap liquid within the reservoir.

3. A method as defined in claim 2, wherein the step of controlling the temperature of the soap liquid in the reservoir includes the step of thermally coupling the reservoir to a thermal mass.

4. A method as defined in claim 2, further comprising the step of storing thermal energy by using the liquid soap contained in the reservoir as a thermal mass buried in soil.

5. A method as defined in claim 1, wherein the replaceable insulation material is supplied within a temperature range of about 50 to 70 degrees Fahrenheit (about 12° C. to 22° C.).

* * * * *